United States Patent
Cegelski et al.

(10) Patent No.: US 7,388,041 B2
(45) Date of Patent: Jun. 17, 2008

(54) PUNCTURE SEALING AGENT FOR A TIRE, AND PROCESS FOR PRODUCING THE SAME

(75) Inventors: Steven Cegelski, Grover Beach, CA (US); Shees Sulemanji, Grover Beach, CA (US)

(73) Assignee: Accessories Marketing, Inc., Grover Beach, CA (US)

( * ) Notice: Subject to any disclaimer, the term of this patent is extended or adjusted under 35 U.S.C. 154(b) by 19 days.

(21) Appl. No.: 11/389,278

(22) Filed: Mar. 24, 2006

(65) Prior Publication Data

US 2007/0225405 A1    Sep. 27, 2007

(51) Int. Cl.
*B29C 73/00* (2006.01)
(52) U.S. Cl. ..................................... 523/166
(58) Field of Classification Search ................ 523/156, 523/166
See application file for complete search history.

(56) References Cited

U.S. PATENT DOCUMENTS

| | | | |
|---|---|---|---|
| 3,352,696 A | 11/1967 | Wallace | |
| 5,466,518 A * | 11/1995 | Isaac et al. | 442/327 |
| 5,856,376 A | 1/1999 | Wong | 523/166 |
| 6,063,837 A | 5/2000 | Kawamura et al. | 523/166 |
| 6,454,892 B1 | 9/2002 | Gerresheim et al. | 156/115 |
| 6,818,596 B1 * | 11/2004 | Hayes | 507/120 |
| 6,840,990 B2 * | 1/2005 | Gallagher et al. | 106/33 |
| 6,864,305 B2 | 3/2005 | Kishida et al. | 524/386 |
| 2004/0010059 A1 | 1/2004 | Kojima et al. | 523/166 |

FOREIGN PATENT DOCUMENTS

| | | |
|---|---|---|
| EP | 0 200 382 A2 | 4/1986 |
| EP | 0 200 382 B1 | 11/1990 |
| EP | 0 846 552 A2 | 6/1998 |
| EP | 0 846 552 B1 | 11/2001 |
| JP | 2001-275362 | 9/2001 |
| JP | 2001-397534 | 12/2001 |

OTHER PUBLICATIONS

PCT/US07/07265, Sep. 25, 2007, International Search Report.
PCT/US07/07265, Sep. 25, 2007, Written Opinion.

* cited by examiner

*Primary Examiner*—Edward J. Cain
(74) *Attorney, Agent, or Firm*—DLA Piper US LLP

(57) ABSTRACT

A puncture sealing agent for a tire is disclosed that has a rubber latex, an adhesive agent, and an anti-freezing agent, wherein glycerin, potassium acetate or a solution of glycerin and potassium acetate is used as the anti-freezing agent.

41 Claims, 3 Drawing Sheets

| % Glycerin | Freezing point, (°C) | Freezing point, (°F) | Flow point, (°C) | Flow point, (°F) |
|---|---|---|---|---|
| 30 | -9 | 16 | | |
| 40 | -16 | 3 | -16 | 3 |
| 50 | -24 | -11 | -19.5 | -3.1 |
| 60 | -36 | -33 | -28 | -18.4 |
| 70 | -41.5 | -43 | -42 | -43.6 |

FIGURE 1

PUNCTURE SEALING AGENT FOR A TIRE, AND PROCESS FOR PRODUCING THE SAME

FIELD OF THE INVENTION

The present invention relates to a puncture sealing agent for a tire or tube, which is prevented from being transformed to a creamy material when being stored for a long term so as to improve long-term shelf life stability of the sealing agent. The invention also relates to a process for producing the sealing agent.

BACKGROUND OF THE INVENTION

When a puncture occurs in a tire, a puncture sealing agent is frequently used. The sealing agent is an agent which is introduced into the tire to seal up the punctured portion from the inside, thereby ensuring the airtightness of the tire so that the tire can be refilled with air.

Puncture sealing agents are known of the type in which a rubber latex is blended with at least an anti-freezing agent. The anti-freezing agent of this known puncture sealing agent may be ethylene glycol or propylene glycol. However, when this known puncture sealing agent is stored for a long term, the rubber particles or adhesive agent particles therein aggregate near the surface so that the sealing agent tends to be transformed into a creamy material. The creamy material clogs the outlet of a tire sealant container hindering the passage of the sealing agent out of the contained into the tire so that smooth puncture sealing operation cannot be carried out.

The creamy material is presumably generated by the following mechanism: in the puncture sealing agent, which is a latex wherein rubber particles and adhesive agent particles are dispersed and floating in an aqueous ethylene glycol solution by ionic repulsive force between the particles and a surfactant, the gravity of the dispersed particles is smaller than that of the aqueous ethylene glycol solution, which is a medium; therefore, the respective rubber particles gradually rise up (float up) in the medium by the action of gravity and the rising particles form a particle-concentrated layer near the surface, whereby the puncture sealing agent is transformed to the creamy material. Thus, it is desirable to provide a puncture sealing agent that overcomes this problem and limitation of the typical puncture sealing agent and it is to this end that the present invention is directed.

SUMMARY OF THE INVENTION

A puncture sealing agent is disclosed that uses glycerin (instead of the typical ethylene glycol or propylene glycol) for the anti-freezing agent since the glycerin has a higher density than typical anti-freezing agents. The puncture sealing agent may also include various surfactant agents that stabilize the rubber particles from rising easily and suppressing the formation of the particle-concentrated layer near the surface. Thus, the puncture sealing agent overcomes the limitations of the typical puncture sealing agents and has longer term storability than the typical puncture sealing agents. A method of producing the puncture sealing agent with the glycerin is disclosed in which the glycerin can be incorporated at a high concentration using high quality glycerin. The process is capable of producing a puncture sealing agent that suppresses the generation of aggregation lumps of rubber particles due to the glycerin anti-freezing agent.

In accordance with the invention, the puncture sealing agent has a rubber latex, an adhesive agent, a surfactant, and an anti-freezing agent wherein glycerin is used as the anti-freezing agent. The ratio of the glycerin to the total weight of the puncture sealing agent is set to between 5 to 75% by weight. Alternatively, potassium acetate may also be used for the anti-freezing agent.

In accordance with another aspect of the invention, a method for producing a puncture sealing agent wherein an adhesive agent and anti-oxidant are mixed. The adhesive agent is then mixed/poured into/with a rubber latex while stirring to prepare the adhesive agent poured/mixed solution. Then, an anti-freezing agent is poured/mixed with an aqueous glycerin solution wherein the surfactant is added to glycerin and diluted with water. To this diluted glycerin solution, fibers are incorporated with steady mixing. This glycerin solution is than slowly poured in to stirred creamy liquid mixture of Latex, adhesive agent and antioxidant to form the puncture sealing agent. Alternatively, potassium acetate may be used as the anti-freezing agent for the puncture sealing agent.

In accordance with yet another aspect of the invention, a puncture sealing agent and method for producing the same may use an anti-freezing agent that is a combination of glycerin and potassium acetate. The glycerin may be diluted with up to a 50% solution of Potassium Acetate in water. The combination of these two anti-freezing agents provides a lower freeze point as compared to glycerin alone.

In accordance with yet another aspect of the invention, a puncture sealing agent and method for producing the same has one or more fibers, a thickening agent and an anti-freezing agent that may be glycerin, potassium acetate or a mixture of glycerin and potassium acetate. This puncture sealing agent may further comprise a rubber latex, an adhesive agent and one or more rubber chunks.

BRIEF DESCRIPTION OF THE DRAWINGS

FIG. 1 is a chart showing the freezing point/flow point for aqueous glycerin solutions.

DETAILED DESCRIPTION OF A PREFERRED EMBODIMENT

Figure 2A:
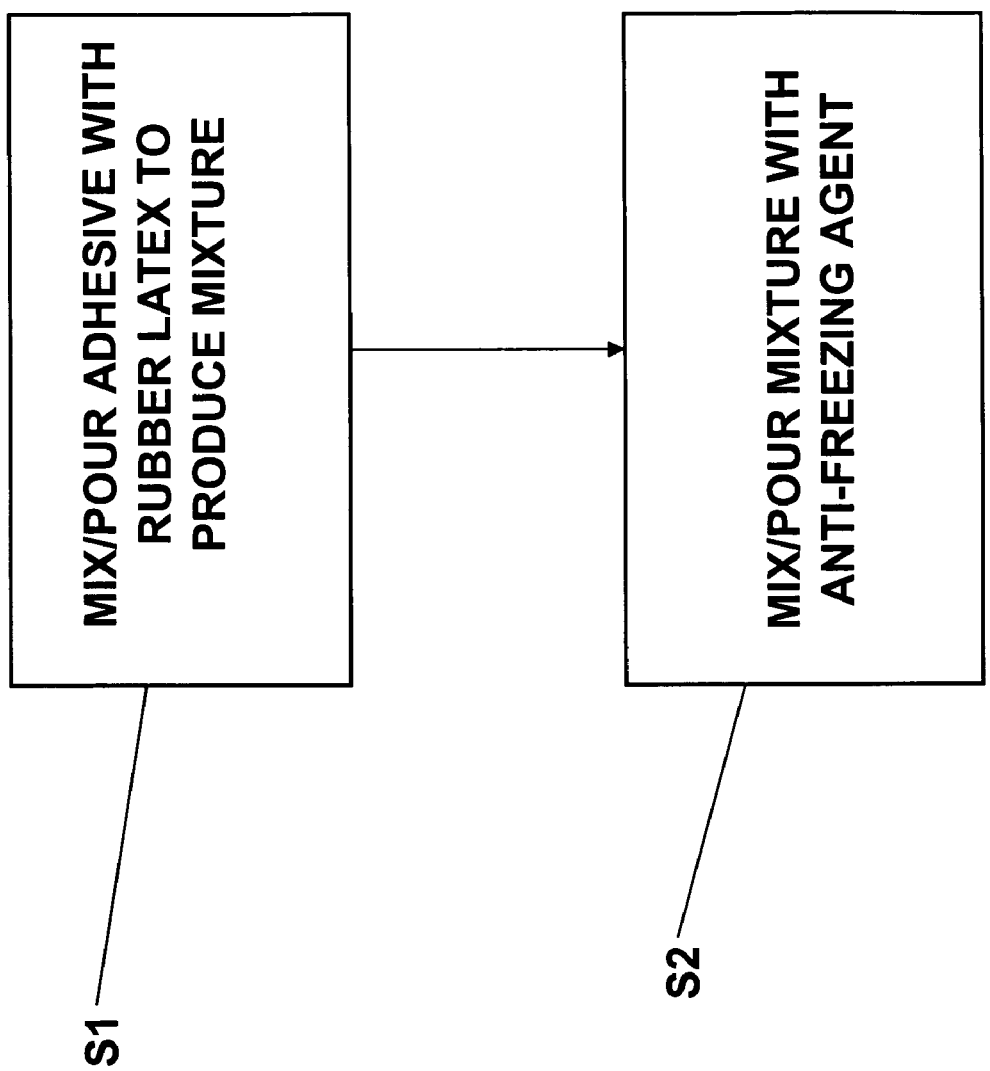
FIGS. 2A and 2B illustrate a method for producing a puncture sealing agent in accordance with the invention.

The invention is particularly applicable to the puncture sealing agent having the particular composition and production method described below and it is in this context that the invention will be described. It will be appreciated, however, that the agent and method in accordance with the invention has greater utility since changes to the materials and composition of the puncture sealing agent as well as the method for producing the puncture sealing agent that are within the scope of the invention.

A puncture sealing agent is a material (initially in liquid form) that may be injected/poured/inserted into a tire in order to repair a puncture in the tire wherein the puncture sealing agent solidifies and seals the puncture in the tire. Now, several examples of a puncture sealing agent of the present invention will be described hereinafter. However, the invention is not limited to the particular examples and embodiments described as changes may be made to the examples without departing from the scope of the invention.

The examples of a first embodiment of the puncture sealing agent described below may include a puncture sealing agent that has a composition that includes a rubber latex, an adhesive agent and an anti-freezing agent. The composition may also include a surfactant agent, fibers or a fibrous compound, an antioxidant agent and/or a corrosion inhibitor agent. In the examples set forth below, the anti-freezing agent may be glycerin, a glycerin and potassium acetate mixture or potassium acetate. In each of the examples, the anti-freezing agent may make up 5 to 75% by weight of the total weight of the puncture sealing agent. The examples of the second embodiment of the puncture sealing agent may include one or more fibers or a fibrous compound, a thickener agent and an anti-freezing agent that may be glycerin, a glycerin and potassium acetate mixture or potassium acetate.

In the first embodiment, the rubber latex used for the puncture sealing agent may be natural rubber or synthetic rubber. However, a natural rubber latex having a high sealing ability is preferably used, while synthetic latex may be used instead of the natural latex or in combination with the natural latex. More preferably, a so-called deprotein natural rubber latex, which is a latex obtained by removing proteins from the natural rubber latex, is used since corrosion thereof can be suppressed because of a smaller amount of ammonia that reduces the corrosion and damage of a steel cord and the reduces the generation of the irritating odor resulting from ammonia. Therefore, it is preferred to use, as the deprotein natural rubber latex, a latex wherein the nitrogen content, which is a conversion criterion of the protein content by percentage, is reduced to 0.1% or less by weight of rubber solid content. The protein content in ordinary natural rubber latexes is from about 0.2 to 0.3% by weight, as a value converted to the nitrogen content. The nitrogen content is a value obtained by measurement according to a well known Kjeldahl method.

As described above, the rubber latex may also be a combination of natural rubber and synthetic rubber wherein the synthetic rubber may be, for example, a styrene-butadiene rubber, an acrylonitrile-butadiene rubber, an ethylene-vinyl acetate rubber, a chloroprene rubber, a vinyl pyridine rubber, or a butyl rubber.

In order that the puncture sealing agent may quickly enter a puncture hole in a tire, close the puncture hole, and maintain the seal over the puncture hole for a certain period of time while the tire is being used, the ratio of the rubber latex to the total weight of the puncture sealing agent is preferably set to 25 to 60% by weight. In this case, the ratio of the rubber solid content (that portion of the rubber latex) to the total weight of the puncture sealing agent is 25% or more by weight.

The adhesive agent of the puncture sealing agent may be selected from any one of the various resin adhesive agents which do not cause aggregation of the rubber latex. For example, terpene resin or phenol resin is preferably used. Other preferred examples of the resin adhesive agent that may be used for the puncture sealing agent include polyvinyl esters, polyvinyl alcohol and polyvinyl pyrrolidine. The adhesive agent is used in order to increase the adhesion between the rubber latex and a tire to improve the sealing ability of the puncture sealing agent. The ratio of the adhesive agent to the total weight of the puncture sealing agent is preferably between 5 and 30% by weight. If the ratio is less than 5% by weight, the adhesiveness of the puncture sealing agent is low so that the sealing ability and seal maintaining ability of the puncture sealing agent are insufficient. On the other hand, if the ratio is more than 30% by weight, the latex content decreases so that the sealing ability of the puncture sealing agent is also lowered.

The puncture sealing agent may be formulated without an adhesive agent if the adhesive agent interferes with the stability of the latex. As described above, the puncture sealing agent may also include fibers or fibrous material that improves the puncture sealing properties of the puncture sealing agent. The fibers may preferably be of a size of between 1 micron and 150 microns.

The anti-freezing agent is used in order to make it possible that the puncture sealing agent to be used without being frozen even in cold climates and to prevent a phenomenon in which the puncture sealing agent is frozen during the storage thereof so that rubber particles therein aggregate. For typical puncture sealing agents, ethylene glycol, which has a high anti-freezing effect, is used as the anti-freezing agent. In the present invention, however, glycerin, potassium acetate or a glycerin and potassium acetate mixture/solution is used in order to suppress the generation of a creamy material near the surface of the puncture sealing agent when the agent is stored for a long term.

FIG. 1 shows examples of different glycerin aqueous solutions and the respective measured freezing and flow points for that different solutions. As shown in FIG. 1, an increasing percentage of glycerin in the solution results in a lower temperature freezing point and flow point. Due to the historical use as an antifreeze, the concept of "flow point" of glycerin solutions was developed way back in the 1930s. The flow point was defined as the temperature at which a glycerin solution containing ice crystals would still flow freely through a ¼ inch orifice. Thus, the freezing point of glycerin is approximately 18° C. (64° F.). However, a glycerin/water mixture of 66.7% glycerin and 33.3% water forms a eutectic mixture with a freezing point of approximately −42° C. (−43° F.). It has also been determined that the measured freezing point for the glycerin/potassium acetate mixture-based puncture sealing agent was about −40° C. Thus, the glycerin or a glycerin and potassium acetate solution/mixture exhibits superior anti-freezing effect, which is equivalent to the anti-freezing effect of ethylene glycol and propylene glycol. Accordingly, while a desired anti-freezing effect can be kept, the amount of glycerin used can be suppressed in the same way as is typically done with ethylene glycol and propylene glycol. Thus, adverse effects on various properties, such as sealing ability, by the anti-freezing agent can be prevented.

As described above, the ratio of glycerin, potassium acetate or the glycerin and potassium acetate mixture to the total weight of puncture sealing agent is from 5 to 75% by weight. If the ratio is less than 20% by weight, the puncture sealing agent may freeze so that the puncture sealing agent cannot be used in cold climates, particularly in the case of low temperatures of −25° C. or less. On the other hand, if the ratio is more than 40% by weight, the latex content decreases relatively so that the sealing ability of the puncture sealing agent deteriorates. Furthermore, if the ratio is >50% by weight product, the viscosity of the puncture sealing agent increases which makes sealant dispensing through the tire valve slower. Therefore, the ratio of the anti-freezing agent (glycerin, potassium acetate or the glycerin and potassium acetate mixture) to the total weight of puncture sealing agent is preferably 20% to 50% which results in a puncture sealing agent that can be used is cold climates that still has optimal sealing abilities. However, if a version of the puncture sealing agent is being sold in warm climates, a lower percentage of anti-freezing agent may be used.

As discussed above, a surfactant may be added, as a stabilizer, to the puncture sealing agent. The surfactant agent may be an anionic surfactant, an ampholytic surfactant, a special carboxylic acid type surfactant or the like. Preferably, an aliphatic acid salt having 9 to 18 carbon atoms may be used as the surfactant agent since the salt exhibits the effect of suppressing coagulation in bulb cores without lowering the sealing ability of the puncture sealing agent. Several examples of the aliphatic acid in the aliphatic acid salt having 9 to 18 carbon atoms may include capric acid having 10 carbon atoms, lauric acid having 12 carbon atoms, myristic acid having 14 carbon atoms, palmitic acid having 16 carbon atoms, and stearic acid, oleic acid and linoleic acid having 18 carbon atoms. Several examples of the salt may include sodium salt, potassium salt, ammonium salt and triethanolamine salt.

For the surfactant agent, ammonium laurate and triethanolamine laurate are particularly preferred since they exhibit superior coagulation-suppressing effect and have a characteristic of improving the coagulation-suppressing effect in proportion to the content thereof. Ammonium laurate or triethanolamine laurate may be used in the state that it is mixed with a second surfactant agent. In this case, the second surfactant agent is preferably a surfactant made of an aliphatic acid salt having 9 to 18 carbon atoms. Ammonium laurate has an ammonia odor so that triethanolamine laurate is more preferably used.

The ratio of the surfactant agent to the total weight of the puncture sealing agent is from 0.4 to 2.0% by weight. If the ratio is less than 0.4% by weight, the stability of the puncture sealing agent becomes insufficient. As a result, the effect of suppressing the generation of the creamy material is damaged, or the agent tends to coagulate easily in bulb cores. On the other hand, if the ratio is more than 2.0% by weight, the sealing ability of the puncture sealing agent may deteriorate. As described above, the puncture sealing agent may optionally include an antioxidant and/or a thinning agent. The antioxidant agent protect against the effects of heat, light, and oxidation that may occur over time. A phenolic type antioxidant is preferred. An exemplary antioxidant would be Akrosperse W-2294 made by Akrochem Chemical in Ohio. The puncture sealing agent may also optionally include a corrosion inhibitor that may include rust and corrosion inhibitors and biocides. 2-mecaptobenzothiazol is an exemplary inhibitor that may be used. Grotan is an exemplary biocide that may be used. Any inhibitor or biocide that a person of ordinary skill in the art deems suitable may be used for the puncture sealing agent. Now, a process for the producing a puncture sealing agent in accordance with the invention will be described in more detail.

Figure 2B:
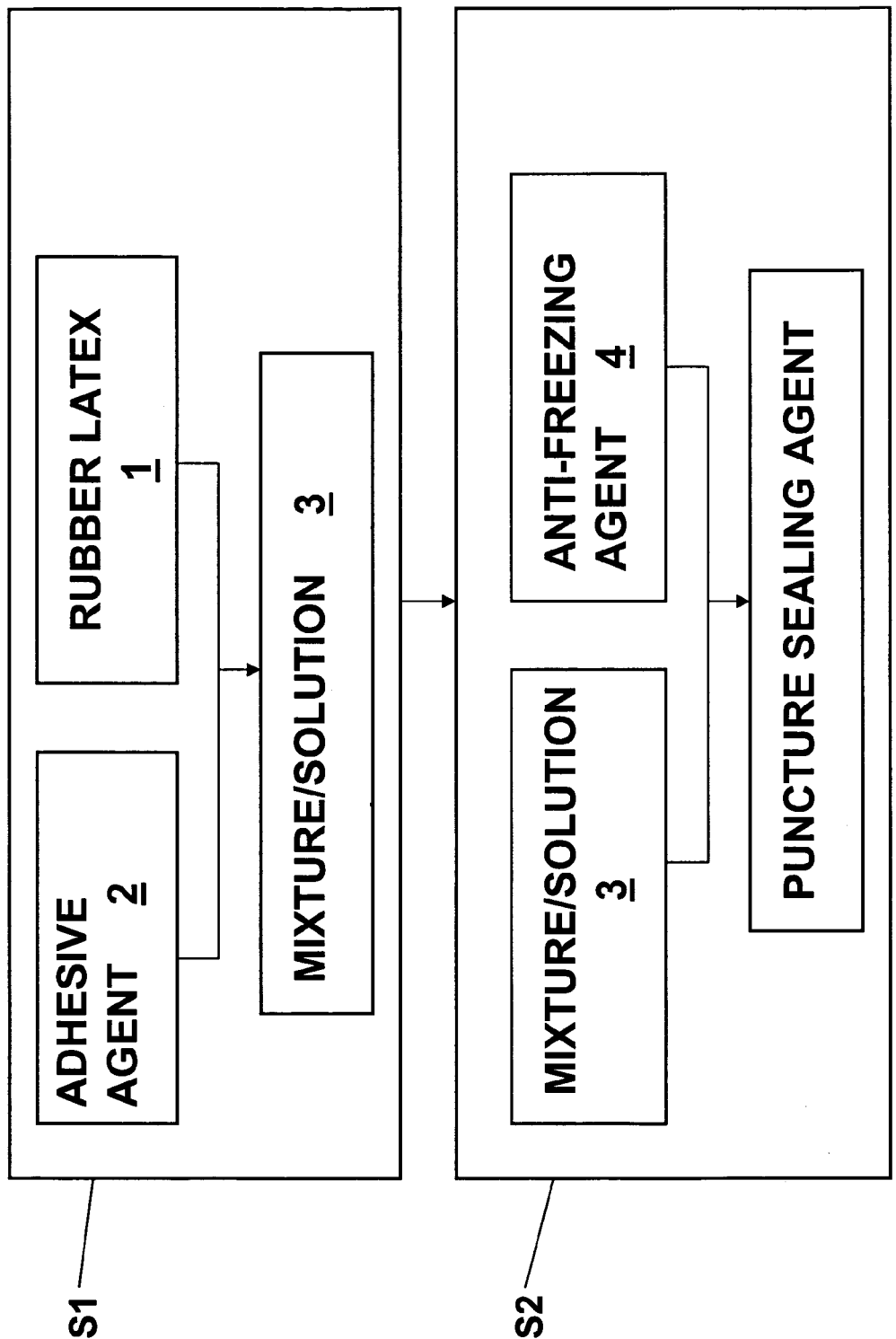

As conceptually shown in FIGS. 2A and 2B, a process for producing the puncture sealing agent includes one or more steps. The steps may preferably include an adhesive pouring/mixing step (S1) in which an adhesive agent 2 is mixed/poured into/with a rubber latex 1 under stirring to prepare a mixture/solution 3. In a step S2, an anti-freezing mixing/pouring step is performed in which the mixture/solution is mixed/poured into/with an anti-freezing agent while stirring. The anti-freezing agent may be an aqueous glycerin solution 4 wherein glycerin is diluted with water or the anti-freezing agent may be a solution/mixture of glycerin and potassium acetate.

Specifically, in the adhesive agent pouring/mixing step S1, the adhesive agent 2 is poured into the rubber latex 1 put in a tank 10 under stirring, to prepare the mixture/solution 3 wherein the rubber latex 1 is homogenously mixed with the adhesive agent 2.

In the anti-freezing agent pouring/mixing step S2, a stock solution of glycerin (concentration: 100%) is not directly poured into the solution, but glycerin is diluted with water to some extent. The resultant aqueous glycerin solution 4 having a high glycerin concentration is used and is poured into the mixture/solution 3 under stirring, and the mixture/solution 3 and glycerin are homogeneously mixed with each other.

As stated above, the mixture/solution 3 is prepared in advance in order to lower the concentration of the rubber contained in the rubber latex 1 by means of the adhesive agent 2. In other words, since the volume of the mixture/solution is increased by the adhesive agent 2, the ratio (concentration) of the rubber in the adhesive agent mixture/solution 3 becomes lower as compared with the ratio of the rubber in the rubber latex 1. The reduction in the rubber concentration causes the dispersed and floating rubber particles to be separated from each other. Therefore, the rubber particles can be prevented from contacting each other and adhering to each other. Furthermore, when the anti-freezing agent is mixed in, the anti-freezing agent is less likely to irritate the rubber particles since they are separated from each other.

Glycerin has a nature that it is mixed with the rubber latex 1 with more difficulty than ethylene glycol or the like, which is generally known as an anti-freezing agent. Therefore, when glycerin is incorporated, at a high concentration, into the anti-freezing agent or when the pouring speed thereof is large, glycerin which has not yet been blended irritates the rubber particles so that rubber aggregation lumps trends to be generated. For this reason, in the present example, glycerin is made to the aqueous solution 4, and is poured and mixed in the state that it is easily mixed with the rubber latex 1. The aggregation of the rubber particles can be suppressed and the generation of the rubber aggregation lumps can be effectively suppressed by synergetic effects from the fact that the adhesive agent 2 is beforehand poured/mixed into/with the rubber latex 1 to lower the rubber concentration and the fact that glycerin is poured/mixed, in an aqueous solution state, into/with the adhesive agent poured/mixed solution 3, which is a mixed solution of the rubber latex and the adhesive agent.

In this case, the concentration of the aqueous glycerin solution is preferably from 92 to 98%. In other words, 92 to 98 parts by weight of glycerin is preferably contained in 100 parts by weight of the aqueous solution thereof. If the concentration is less than 92%, it is difficult to make the freezing temperature of the puncture sealing agent sufficiently low. If the concentration is more than 98%, a difficulty in mixing the aqueous solution with the rubber latex cannot be sufficiently overcome so that the aqueous solution irritates the rubber particles so that rubber aggregation lumps are easily generated.

In the anti-freezing agent pouring/mixing step S2, it is preferred to control the pouring speed of the aqueous glycerin solution 4 in the range of 5 to 20 liters/minute and control the rotation speed in the stirring in the range of 30 to 400 rpm. If the pouring speed is less than 5 liters/minute, the time to produce the puncture sealing agent become too long resulting in a drop in production efficiency and a rise in production costs. On the other hand, if the pouring speed is more than 20 liters/minute, the aqueous solution is not sufficiently mixed. If the rotation speed is less than 30 rpm, the aqueous solution is not sufficiently mixed (and rubber aggregation lumps occur), and if the rotation speed is more than 400 rpm, the aqueous solution irritates the rubber particles and rubber aggregation lumps are generated.

In the adhesive agent pouring/mixing step S1, the pouring method, the pouring speed, the rotation speed in the stirring, and so on are not particularly limited. However, they preferably follow those in the anti-freezing agent poured/mixed step S2 in order to suppress the generation of rubber aggregation lumps.

In the case that the puncture sealing agent contains the surfactant, the surfactant is mixed with the anti-freezing agent (glycerin diluted with water) and poured in to the rubber latex 1 prior to the anti-freezing agent pouring/mixing step S2.

The above has described particularly preferred examples of the present invention in detail. However, the present invention is not limited to these illustrated examples and may be modified.

For the glycerin puncture sealing agent, the process to produce that puncture sealing agent included pouring an adhesive agent into a natural rubber latex under stirring so as to prepare an adhesive agent poured/mixed solution. After the end of the pouring, the stirring was continued for 5 minutes. For this agent, the pouring speed was 20 liters/minute, and rotation speed in the stirring was 200 rpm. After the stirring was completed, an aqueous glycerin solution (or a stock glycerin solution in an alternative embodiment) was poured into the prepared adhesive agent poured/mixed solution under stirring, to prepare a puncture sealing agent with the glycerin anti-freezing agent. After the end of the pouring, the stirring was continued for 10 minutes with the pouring speed being 15 liters/minute and rotation speed in the stirring was 200 rpm.

The freezing point, sealing ability and storability for the examples set forth below was improved over the typical puncture sealing agents. For the examples using glycerin as the anti-freezing agent, the puncture sealing agent had the same low temperature property and sealing ability as the product in the prior art; and further the transformation to a creamy material was able to be suppressed when the agents were stored for a long term, and the storability thereof was improved.

For the puncture sealing agents A and B (See Table 1 below) produced that uses glycerin and potassium acetate, the generation of rubber aggregation lumps in the production was able to be largely suppressed as shown in Table 1. Thus, the second aspect of the present invention makes it possible to produce a high-quality puncture sealing agent into which glycerin is incorporated at a high concentration. To measure the storability of these examples, a 300-500 grams of each prepared puncture sealing agent was put in a container in a bottle form, and the container was stored to stand still in an oven of 80.degree. C. for 250 hours. Thereafter, the weight of a generated creamy material was measured. In the Table, the weight is represented as percentage in the whole rubber component.

TABLE 1

Example of Typical Puncture Sealing Agents

| | Example A | Example B |
|---|---|---|
| Natural Rubber Latex | 373.99 grams | 480.84 grams |
| % age of Cream after 250 Hours of Exposure at 80° C. | 6.0 | 5.9 |

Table 2 below illustrates examples of the formulation of the puncture sealing agents in accordance with one embodiment of the invention. The percentages in the table are the percentage of a particular substance as compared to the total weight of the puncture sealing agent so that, for example, the first four examples contain 65% by weight of glycerin.

TABLE 2

Exemplary Formulations of the Puncture Sealing Agent

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Glycerin | 65% | 65% | 65% | 65% | 50% | 50% | 50% | 50% |
| Potassium Acetate | 0% | 0% | 0% | 0% | 15% | 15% | 15% | 15% |
| Adhesive | 0% | 3% | 0% | 3% | 0% | 0% | 3% | 3% |
| Natural Rubber Latex | 26% | 23% | 13% | 11.5% | 26% | 13% | 23% | 11.5% |
| Synthetic Rubber Latex | 0% | 0% | 13% | 11.5% | 0% | 13% | 0% | 11.5% |
| Surfactant | 2.0% | 2.0% | 2.0% | 2.0% | 2.0% | 2.0% | 2.0% | 2.0% |
| Fibers | 2.5% | 2.5% | 2.5% | 2.5% | 2.5% | 2.5% | 2.5% | 2.5% |
| Corrosion Inhibitor | 2.5% | 2.5% | 2.5% | 2.5% | 2.5% | 2.5% | 2.5% | 2.5% |
| Antioxidant | 2% | 2% | 2% | 2% | 2% | 2% | 2% | 2% |

The puncture sealing agent can also be made in accordance with another embodiment of the invention in which the puncture sealing agent comprises a thickening agent, one or more fibers and an anti-freezing agent wherein may be glycerin, potassium acetate or a mixture of potassium acetate and glycerin. This puncture sealing agent may also include a rubber latex, an adhesive agent, one or more rubber chunks and the like. In this embodiment with glycerin used as the anti-freezing agent, the ratio of the glycerin to the total weight of the puncture sealing agent is set to 5 to 50% by weight. The puncture sealing agent may contain other contents as shown below in the examples. In order that the puncture sealing agent may quickly enter a puncture hole in a tire by running of the tire, close the puncture hole, and further keep sealing ability up to a certain measure of mileage, the ratio of the rubber latex to the total weight of the puncture sealing agent is set to 0.5% to 15% by weight.

The adhesive agent for this embodiment may be similar to the adhesive agent described above and may be a resin adhesive agent that is used to increase the adhesion between the fibers and a tire to improve sealing ability, and the ratio thereof to the total weight of the puncture sealing agent is preferably from 1 to 10% by weight. If the ratio is less than 1% by weight, the adhesiveness of the puncture sealing agent is low so that the sealing ability and seal keeping ability are insufficient. On the other hand, if the ratio is more than 10% by weight, the adhesive agent increases the viscosity of the puncture sealing agent so that the agent does not flow smoothly. The anti-freezing agent is used in order to make it possible that the puncture sealing agent is used without being frozen even in cold climates as described above and to prevent a phenomenon that the puncture sealing agent is frozen during the storage thereof so that rubber particles therein aggregate. In this embodiment, the anti-freezing agent may be glycerin or a glycerin and potassium acetate solution/mixture is used in order to suppress the freeze point. The glycerin may be diluted with a solution of potassium acetate in water with the ratio of glycerin to the potassium acetate solution 20% to 40% glycerin and 20% to 40% Potassium Acetate to drive down the freeze point.

In this embodiment, the ratio of the rubber latex is 1-10% by weight and the ratio of the adhesive agent is 1-10% by weight to the total weight of the puncture sealing agent composition. The thickening agent may be in the form of clays e.g. Bentonite clay, Atapulgite clay, Hectorite clay or it may be in the form of cellulose thickener like Hydroxy ethyl cellulose, Hydroxy propyl cellulose, carboxy methyl cellulose or a derivative thereof. The thickening agent also may be a natural gum like Xanthan gum or Guar gum. The thickener may also be anionic, cationic or non ionic thickening agent. The puncture sealing agent may also include an anti-settling agent to prevent particle settling wherein the anti-settling agent may be particulate or liquid in nature.

Table 3 below illustrates examples of the formulation of the puncture sealing agents in accordance with this other embodiment of the invention. As before, the percentages in the table are the percentage of a particular substance as compared to the total weight of the puncture sealing agent.

TABLE 3

Exemplary Formulations of the Puncture Sealing Agent

|  | Ex. 1 | Ex. 2 |
|---|---|---|
| Glycerin | 30% | 30% |
| Potassium Acetate | 0% | 10% |
| Water | 38.9% | 28.9% |
| Anti-Settling Agent | 5% | 5% |
| Thickener | 5% | 5% |
| Adhesive | 3% | 3% |
| Rubber Particles | 5% | 5% |
| Latex | 3% | 3% |
| Color | 0.1% | 0.1% |
| Fibers | 10% | 10% |

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A puncture sealing agent, comprising:
a rubber latex comprising one of a natural rubber and a synthetic rubber mixed with a glycerin anti-freezing agent wherein a ratio of the glycerin anti-freezing agent to the total weight of the puncture sealing agent composition is between 5 and 75% by weight.

2. The puncture sealing agent of claim 1 further comprising an adhesive agent for additional sealing capability wherein a ratio of the adhesive agent to the total weight of the puncture sealing agent composition is between 5% and 30% by weight.

3. The puncture sealing agent of claim 1 further comprising an anti-corrosion agent.

4. The puncture sealing agent of claim 1 further comprising one of fibers and fibrous materials that enhance sealing capability of puncture sealing agent.

5. The puncture sealing agent of claim 1, wherein the fibers have a size of between 1 micron and 150 microns.

6. The puncture sealing agent of claim 1, wherein the glycerin anti-freezing agent further comprises glycerin diluted with a 5% to 50% solution of potassium acetate in water.

7. The puncture sealing agent of claim 6, wherein a decreasing ratio of the glycerin to the potassium acetate solution lowers a freezing point of the puncture sealing agent.

8. The puncture sealing agent of claim 6, wherein the ratio of the rubber latex to the total weight of the puncture sealing agent composition is between 25% and 60% by weight.

9. The puncture sealing agent of claim 1 further comprising a surfactant that is one of an anionic surfactant, an ampholytic surfactant, a carboxylic acid type surfactant and an aliphatic acid salt.

10. A puncture sealing agent, comprising:
a rubber latex mixed with an anti-freezing agent wherein the anti-freezing agent comprises potassium acetate in water; and wherein the ratio of the potassium acetate to the total weight of the puncture sealing agent is between 5 and 75% by weight.

11. The puncture sealing agent of claim 10 further comprising an adhesive agent for additional sealing capability wherein a ratio of the adhesive agent to the total weight of the puncture sealing agent composition is between 5% and 30% by weight.

12. The puncture sealing agent of claim 10 further comprising an anti-corrosion agent.

13. The puncture sealing agent of claim 10 further comprising one of fibers and fibrous materials that enhance sealing capability of puncture sealing agent.

14. The puncture sealing agent of claim 10, wherein the fibers have a size of between 1 micron and 150 microns.

15. The puncture sealing agent of claim 10, wherein the rubber latex further comprises one of a natural rubber and a synthetic rubber.

16. The puncture sealing agent of claim 10 further comprising a surfactant that is one of an anionic surfactant, an ampholytic surfactant, a carboxylic acid type surfactant and an aliphatic acid salt.

17. A method for producing a puncture sealing agent wherein the puncture sealing agent has a rubber latex, an adhesive agent, and an anti-freezing agent, wherein said anti-freezing agent comprises glycerin and the ratio of the glycerin to the total weight of the puncture sealing agent composition is 5 to 50% by weight, the method comprising:
mixing an adhesive agent with a rubber latex while stirring to yield a mixture; and
mixing a glycerin solution with the mixture to form the puncture sealing agent.

18. The method of claim 17, wherein mixing the glycerin solution further comprising mixing an aqueous solution comprising glycerin diluted with a 5% to 50% solution of potassium acetate in water with the mixture to form the puncture sealing agent.

19. The method of claim 18, wherein mixing the aqueous solution further comprises pouring the aqueous solution into the mixture of said adhesive agent and said latex under stirring at a pouring speed of 5 to 20 liters per minute and stirring the aqueous solution into the mixture of said adhesive agent and said latex at a speed of between 30 and 400 rpm.

20. The method of claim 17, wherein the mixture further comprises mixing a plurality of fibers into the mixture.

21. The method of claim 20, wherein the plurality of fibers have a size of between 1 micron and 150 microns.

22. A method for producing a puncture sealing agent wherein the puncture sealing agent has a rubber latex, an adhesive agent, and an anti-freezing agent, wherein said anti-freezing agent comprises potassium acetate in water and the ratio of the potassium acetate to the total weight of the puncture sealing agent composition is 5 to 50% by weight, the method comprising:
- mixing an adhesive agent with a rubber latex while stirring to yield a mixture; and
- mixing a potassium acetate solution with the mixture to form the puncture sealing agent.

23. The method of claim 22, wherein mixing the solution further comprises pouring the solution into the mixture of said adhesive agent and said latex under stirring at a pouring speed of 5 to 20 liters per minute and stirring the solution into the mixture of said adhesive agent and said latex at a speed of between 30 and 400 rpm.

24. The method of 22, wherein the mixture further comprises a plurality of fibers into the mixture.

25. The method of claim 24, wherein the plurality of fibers have a size of between 1 micron and 150 microns.

26. A puncture sealing agent comprising:
- one or more fibers, a thickening agent and a glycerin anti-freezing agent mixed together and further comprising one of a rubber latex, an adhesive agent and one or more rubber chunks mixed into the agent; and
- wherein the ratio of the glycerin to the total weight of the puncture sealing agent is 5 to 70% by weight.

27. The puncture sealing agent of claim 26 further comprising a thickening agent mixed into the agent, the thickening agent further comprises one of a clay thickener, a cellulose thickener and a natural gum.

28. The puncture sealing agent of claim 27, wherein the clay thickener further comprises one of a Bentonite clay, an Atapulgite clay and a Hectorite clay, wherein the cellulose thickener further comprises one of a Hydroxy ethyl cellulose, a Hydroxy propyl cellulose, a carboxy methyl cellulose and derivatives, and wherein the natural gum further comprises one of a Xanthan gum and a Guar gum.

29. The puncture sealing agent of claim 26, wherein the one or more fibers form an interlocking network thereby clotting a puncture hole and stopping outbound air passage from a tire into which the puncture sealing agent is inserted.

30. The puncture sealing agent of claim 26 further comprising a corrosion inhibitor mixed into the agent.

31. The puncture sealing agent of claim 26 further comprising a biocide mixed into the agent.

32. The puncture sealing agent of claim 26, wherein the ratio of the rubber latex is 1-10% by weight to the total weight of the puncture sealing agent and the ratio of the adhesive agent is 1-10% by weight to the total weight of the puncture sealing agent.

33. A puncture sealing agent comprising:
- one or more fibers, a thickening agent and an anti-freezing agent mixed together; and
- wherein the anti-freezing agent further comprises a mixture of potassium acetate and water and the ratio of the potassium acetate to the total weight of the puncture sealing agent composition is 5 to 70% by weight.

34. The puncture sealing agent of claim 33 wherein the anti-freezing agent further comprises glycerin wherein the ratio of glycerin to the mixture of potassium acetate and water is 10% to 60% glycerin and 10% to 60% potassium acetate to reduce a freeze point of the agent.

35. The puncture sealing agent of claim 33 further comprising a thickening agent mixed into the agent, the thickening agent further comprises one of a clay thickener, a cellulose thickener and a natural gum.

36. The puncture sealing agent of claim 35, wherein the clay thickener further comprises one of a Bentonite clay, an Atapulgite clay and a Hectorite clay, wherein the cellulose thickener further comprises one of a Hydroxy ethyl cellulose, a Hydroxy propyl cellulose, a carboxy methyl cellulose and derivatives, and wherein the natural gum further comprises one of a Xanthan gum and a Guar gum.

37. The puncture sealing agent of claim 33, wherein the one or more fibers form an interlocking network thereby clotting a puncture hole and stopping outbound air passage from a tire into which the puncture sealing agent is inserted.

38. The puncture sealing agent of claim 33 further comprising a corrosion inhibitor mixed into the agent.

39. The puncture sealing agent of claim 33 further comprising a biocide mixed into the agent.

40. The puncture sealing agent of claim 33 further comprising one of a rubber latex, an adhesive agent and one or more rubber chunks mixed into the agent.

41. The puncture sealing agent of claim 40, wherein the ratio of the rubber latex is 1-10% by weight to the total weight of the puncture sealing agent and the ratio of the adhesive agent is 1-10% by weight to the total weight of the puncture sealing agent.

* * * * *